(12) United States Patent
Chung et al.

(10) Patent No.: US 9,257,725 B2
(45) Date of Patent: Feb. 9, 2016

(54) SEPARATOR FOR LITHIUM CELLS HAVING POROUS AND CURED LAYERS ON A NON-WOVEN SUPPORT

(75) Inventors: Li-Han Chung, Miaoli County (TW); Dan-Cheng Kong, Hsinchu (TW); Ming-Cheng Feng, Tainan County (TW); Chih-Hung Lee, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 297 days.

(21) Appl. No.: 13/555,141

(22) Filed: Jul. 21, 2012

(65) Prior Publication Data

US 2013/0157107 A1    Jun. 20, 2013

(30) Foreign Application Priority Data

Dec. 20, 2011 (TW) .............................. 100147276 A

(51) Int. Cl.
| | |
|---|---|
| H01M 2/16 | (2006.01) |
| H01M 10/42 | (2006.01) |
| C09D 1/00 | (2006.01) |
| D06N 3/00 | (2006.01) |
| D06N 3/18 | (2006.01) |
| D06N 3/04 | (2006.01) |
| D06N 3/12 | (2006.01) |
| H01M 10/052 | (2010.01) |

(52) U.S. Cl.
CPC ............. *H01M 10/4235* (2013.01); *C09D 1/00* (2013.01); *D06N 3/0011* (2013.01); *D06N 3/0036* (2013.01); *D06N 3/0043* (2013.01); *D06N 3/047* (2013.01); *D06N 3/128* (2013.01); *D06N 3/183* (2013.01); *H01M 2/1686* (2013.01); *H01M 2/1653* (2013.01); *H01M 10/052* (2013.01)

(58) Field of Classification Search
CPC ............ H01M 2/1653; H01M 2/1686; H01M 10/4235
USPC .......................................................... 429/144
See application file for complete search history.

(56) References Cited

U.S. PATENT DOCUMENTS

| | | | |
|---|---|---|---|
| 6,024,773 A | 2/2000 | Inuzuka et al. | |
| 6,080,507 A | 6/2000 | Yu | |
| 6,159,630 A | 12/2000 | Wyser | |
| 6,159,634 A | 12/2000 | Yen et al. | |

(Continued)

FOREIGN PATENT DOCUMENTS

| | | |
|---|---|---|
| CN | 101188283 | 5/2008 |
| CN | 101346831 | 1/2009 |

(Continued)

OTHER PUBLICATIONS

Xia Zhan et al., "Enhanced Pervaporation Performance of Multi-Layer PDMS/PVDF Composite Membrane for Ethanol Recovery from Aqueous Solution," Appl Biochem Biotechnol, Jan. 2009, pp. 632-642, vol. 160, Humana Press, US.

(Continued)

*Primary Examiner* — Nicholas P D'Aniello

(57) ABSTRACT

In an embodiment of the disclosure, a separator utilized in a lithium battery is provided. The separator includes a non-woven polyester support, a porous layer of polyvinylidene fluoride (PVDF) or its derivatives formed on the non-woven polyester support, a layer of UV-curing or thermal-curing polymers formed on top of the porous layer of polyvinylidene fluoride (PVDF) or its derivatives.

6 Claims, 1 Drawing Sheet

(56) References Cited

U.S. PATENT DOCUMENTS

| | | |
|---|---|---|
| 6,261,721 B1 | 7/2001 | Andrieu et al. |
| 6,579,648 B2 | 6/2003 | Nakamizo et al. |
| 6,818,352 B2 | 11/2004 | Daido et al. |
| 6,881,438 B2 | 4/2005 | Daido et al. |
| 7,008,722 B2 * | 3/2006 | Huang ............ 429/188 |
| 7,087,343 B2 | 8/2006 | Shi et al. |
| 7,094,497 B2 | 8/2006 | Daido et al. |
| 7,258,914 B2 | 8/2007 | Morikawa et al. |
| 7,604,895 B2 * | 10/2009 | Kim et al. ............ 429/141 |
| 2002/0192528 A1 * | 12/2002 | Sixt et al. ............ 429/35 |
| 2003/0064282 A1 * | 4/2003 | Nakagawa et al. ........ 429/144 |
| 2003/0157409 A1 * | 8/2003 | Huang ............ 429/306 |
| 2005/0014063 A1 | 1/2005 | Shi et al. |
| 2007/0221265 A1 * | 9/2007 | Affinito et al. ......... 136/243 |
| 2009/0047498 A1 | 2/2009 | Hutchenson et al. |
| 2009/0169984 A1 * | 7/2009 | Liang et al. ............ 429/129 |
| 2011/0027658 A1 * | 2/2011 | Kim et al. ............ 429/247 |
| 2011/0165459 A1 * | 7/2011 | Halalay et al. ......... 429/217 |

FOREIGN PATENT DOCUMENTS

| | | |
|---|---|---|
| CN | 101471432 | 7/2009 |
| TW | 200501471 | 1/2005 |
| TW | I260811 | 8/2006 |
| TW | 200924846 | 6/2009 |

OTHER PUBLICATIONS

M.L. Yeow et al., "Preparation of Divinyl-PDMS/PVDF Composite Hollow Fibre Membrane for BTX Removal," Journal of Membrane Science, Jun. 2002, pp. 137-143, vol. 203, Elsevier, US.

Hanfei Zhen et al., "Modified Silicone-PVDF Composite Hollow-Fiber Membrane Preparation and Its Application in VOC Separation," Journal of Applied Polymer Science, Dec. 2005, pp. 2497-2503, vol. 99, Wiley Periodicals, Inc. US.

Xin (Cindy) Jiang et al., "Polyurethane-Poly(Vinylidene Fluoride) (PU-PVDF) Thin Film Composite Membranes for Gas Separation," Journal of Membrane Science, Oct. 2008, pp. 371-378, vol. 323, Elsevier, US.

China Patent Office, Office Action, Patent Application Serial No. 201110461239.5, Oct. 29, 2014, China.

Taiwan Patent Office, Office Action, Patent Application Serial No. 100147276, Jun. 12, 2014, Taiwan.

* cited by examiner

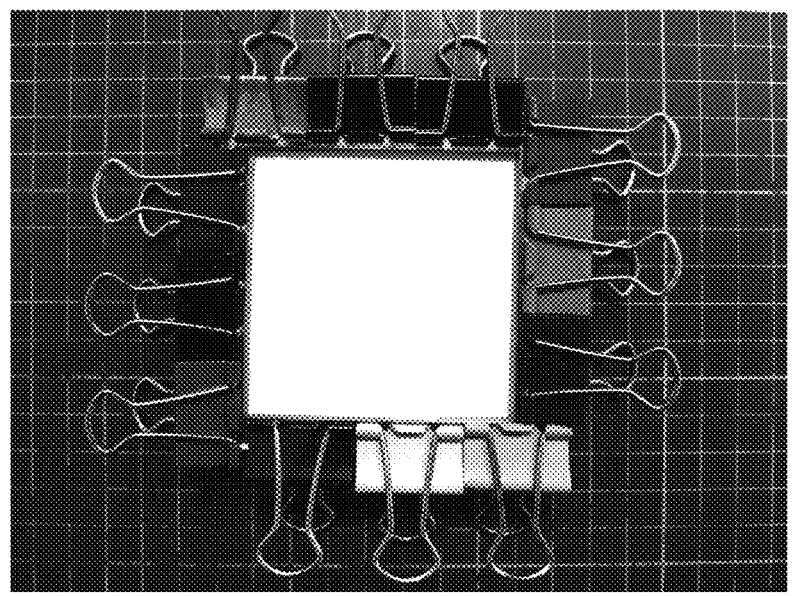

SEPARATOR FOR LITHIUM CELLS HAVING POROUS AND CURED LAYERS ON A NON-WOVEN SUPPORT

CROSS REFERENCE TO RELATED APPLICATIONS

This Application claims priority of Taiwan Patent Application No. 100147276, filed on Dec. 20, 2011, the entirety of which is incorporated by reference herein.

BACKGROUND OF THE DISCLOSURE

1. Field of the Disclosure

The disclosure relates to a separator utilized in a lithium battery, and in particular to a heat-resistant separator utilized in a lithium battery.

2. Description of the Related Art

The secondary lithium battery has become one of the main energy sources of electric vehicles due to its advantages of high energy density, etc. With increase in the demand for motive power of electric vehicles, the energy density of the battery has increased. Also, the requirement of the power output and the size of the battery have increased which causes a lot more heat generated when a high-power battery is operated. Improvement in the safety of the internal parts of the battery is imperative due to the non-aqueous and flammable electrolyte. If heat cannot be efficiently eliminated, the temperature of the battery will increase.

In order to prevent solvents from catching on fire and explosion caused by overheating of a battery, safety has becomes one of the important topics. Therefore, to design a separator utilized in a lithium battery which has the characteristics of stabilizing current, avoiding the electrolyte directly contacting with the electrode, heat resistance, improved mechanical properties, heat stability, no formation of cracks when the electrode expands, no decrease in power when the electrode is compressed, and no formation of cracks caused by poor heat resistance which causes a short circuit, etc., has become a common goal those skilled in the art strive to pursue.

BRIEF SUMMARY OF THE DISCLOSURE

One embodiment of the disclosure provides a separator utilized in a lithium battery, comprising: a non-woven polyester support; a porous layer of polyvinylidene fluoride (PVDF) or its derivatives formed on the non-woven polyester support; and a layer of UV-curing or thermal-curing polymers formed on top of the porous layer of polyvinylidene fluoride (PVDF) or its derivatives.

The non-woven polyester support comprises polyethylene terephthalate (PET), polypropylene terephthalate (PPT), polycyclohexylene dimethylene terephthalate (PCT) or a combination thereof.

The porous layer of polyvinylidene fluoride (PVDF) or its derivatives comprises polyvinylidene fluoride (PVDF), polyvinylidene fluoride-hexafluoropropene (PVDF-HFP) copolymer, polyvinylidene fluoride-chlorotrifluoroethylene (PVDF-CTFE) copolymer or derivatives or a combination thereof. The porous layer of polyvinylidene fluoride (PVDF) or its derivatives has a melting point of 160-175° C. The porous layer of polyvinylidene fluoride (PVDF) or its derivatives has a coating weight of 35.6-89 g/m$^2$.

The layer of UV-curing or thermal-curing polymers comprises polydimethylsiloxane (PDMS) or epoxy. The polydimethylsiloxane (PDMS) is prepared by dimethylsiloxanes having an end group of dimethylvinyl, dimethylhexenyl or trimethylsiloxy or a combination thereof. The polydimethylsiloxane (PDMS) is a cross-linked polydimethylsiloxane. The layer of UV-curing or thermal-curing polymers has a coating weight of 19.4-36.4 g/m$^2$.

The composite separator prepared in the disclosure includes three kinds of materials: (1) porous non-woven polyester, (2) polyvinylidene fluoride (PVDF) or its derivatives and (3) UV-curing or thermal-curing polymers such as polydimethylsiloxane (PDMS) or epoxy. The UV-curing or thermal-curing polymers such as polydimethylsiloxane (PDMS) or epoxy are used to adjust the gas permeation rate of the composite separator. The polyvinylidene fluoride (PVDF) or its derivatives mainly serve as a heat-resistant separation layer. As for the porous non-woven polyester, it is used as a supporting layer with dimensional stability under a high temperature. The composite separator prepared by the above-mentioned three kinds of materials of the disclosure effectively improves the safety of the use of a lithium battery.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawing, wherein:

FIG. 1 shows a composite separator after baking at 200° C. for 20 minutes according to an embodiment of the disclosure.

DETAILED DESCRIPTION OF THE DISCLOSURE

The following description is of the best-contemplated mode of carrying out the disclosure. This description is made for the purpose of illustrating the general principles of the disclosure and should not be taken in a limiting sense. The scope of the disclosure is best determined by reference to the appended claims.

One embodiment of the disclosure provides a separator utilized in a lithium battery. The separator comprises a non-woven polyester support, a porous layer of polyvinylidene fluoride (PVDF) or its derivatives and a layer of UV-curing or thermal-curing polymers. The porous layer of polyvinylidene fluoride (PVDF) or its derivatives is formed on the non-woven polyester support. The layer of UV-curing or thermal-curing polymers is formed on top of the porous layer of polyvinylidene fluoride (PVDF) or its derivatives.

The non-woven polyester support may comprise polyethylene terephthalate (PET), polypropylene terephthalate (PPT), polycyclohexylene dimethylene terephthalate (PCT) or a combination thereof, for example, poly(cyclohexylene dimethylene terephthalate) acid (PCTA) or poly(cyclohexylene dimethylene terephthalate) glycol (PCTG).

The layer of polyvinylidene fluoride (PVDF) or its derivatives is porous and may comprise polyvinylidene fluoride (PVDF), polyvinylidene fluoride-hexafluoropropene (PVDF-HFP) copolymer, polyvinylidene fluoride-chlorotrifluoroethylene (PVDF-CTFE) copolymer or derivatives or a combination thereof. The porous layer of polyvinylidene fluoride (PVDF) or its derivatives has a melting point of about 160-175° C. and a coating weight of about 35.6-89 g/m$^2$.

The layer of UV-curing or thermal-curing polymers may comprise polydimethylsiloxane (PDMS) or epoxy, with a coating weight of about 19.4-36.4 g/m$^2$. The polydimethylsiloxane (PDMS) is prepared by, for example, dimethylsiloxanes having an end group of dimethylvinyl, dimethylhexenyl or trimethylsiloxy or a combination thereof. Additionally, the polydimethylsiloxane (PDMS) may be a cross-linked polydimethylsiloxane.

One embodiment of the disclosure provides a method for preparing a separator utilized in a lithium battery. In an embodiment, the prepared separator is a three-tiered composite separator (A/B/C layers). The A layer is composed of porous non-woven polyester, for instance, polyethylene terephthalate (PET), polypropylene terephthalate (PPT), polycyclohexylene dimethylene terephthalate (PCT) or a combination thereof, with a thickness of about 30-40 μm. The B layer is composed of polyvinylidene fluoride (PVDF) or its derivatives, for instance, polyvinylidene fluoride (PVDF), polyvinylidene fluoride-hexafluoropropene (PVDF-HFP) copolymer, polyvinylidene fluoride-chlorotrifluoroethylene (PVDF-CTFE) copolymer or derivatives or a combination thereof. The C layer is composed of UV-curing or thermal-curing polymers, for instance, polydimethylsiloxane (PDMS) or epoxy. The A layer is prepared by, for example, melt spinning or wet-laid. Next, the polyvinylidene fluoride (PVDF) or its derivatives is dissolved in, for example, N-methyl pyrrolidone (NMP) to form a solution with a solid content of about 10-25 wt %. The solution is then coated on the A layer by, for example, wet coating. After precipitating by water, washing and drying, the B layer is prepared. The polydimethylsiloxane (PDMS) or epoxy is then dissolved (diluted) in, for example, n-hexane or methyl ethyl ketone (MEK) to prepare a polydimethylsiloxane (PDMS) or epoxy solution with a solid content of about 40-75 wt %.

Next, 5 wt % (corresponding to the solid content of the polydimethylsiloxane (PDMS)) of a cross-linking agent, for example, methyl hydrogen siloxane and 5 wt % (corresponding to the solid content of the polydimethylsiloxane (PDMS) or the epoxy) of a catalyst, for example, platinum complex are added to the polydimethylsiloxane (PDMS) solution, or the epoxy solution is diluted with methyl ethyl ketone (MEK). After uniform stirring, the polydimethylsiloxane (PDMS) or epoxy solution is coated on the layer of polyvinylidene fluoride (PVDF) or its derivatives/non-woven polyester. After a cross-linking reaction at 100-120° C., the present composite separator is formed.

The composite separator prepared by the disclosure includes three kinds of materials: (1) porous non-woven polyester, (2) polyvinylidene fluoride (PVDF) or its derivatives and (3) UV-curing or thermal-curing polymers such as polydimethylsiloxane (PDMS) or epoxy. The UV-curing or thermal-curing polymers such as polydimethylsiloxane (PDMS) or epoxy are used to adjust the gas permeation rate of the composite separator. The polyvinylidene fluoride (PVDF) or its derivatives mainly serve as a heat-resistant separation layer. As for the porous non-woven polyester is used as a supporting layer with dimensional stability under a high temperature. The composite separator prepared by the above-mentioned three kinds of materials of the disclosure effectively improves the safety of lithium battery.

Example 1

Preparation of the Separator (1)

In this example, the prepared separator was a three-layer composite separator (A/B/C layers). The A layer was composed of porous non-woven polyethylene terephthalate (PET), with a thickness of about 30-40 μm. The B layer was composed of polyvinylidene fluoride (PVDF). The C layer was composed of polydimethylsiloxane (PDMS). The A layer was prepared by melt spinning. Next, the polyvinylidene fluoride (PVDF) was dissolved in N-methyl pyrrolidone (NMP) to form a polyvinylidene fluoride (PVDF) solution with a solid content of 14 wt %. The polyvinylidene fluoride (PVDF) solution was then coated on the A layer. After precipitating, washing and drying, the B layer was prepared. The polydimethylsiloxane (PDMS) was then dissolved (diluted) in n-hexane to prepare a polydimethylsiloxane (PDMS) solution with a solid content of 40 wt %. Next, 5 wt % of methyl hydrogen siloxane (cross-linking agent) and 5 wt % of platinum complex (catalyst) were added to the polydimethylsiloxane (PDMS) solution (the contents of the cross-linking agent and the catalyst were based on the solid content of the polydimethylsiloxane (PDMS)). After uniform stirring, the polydimethylsiloxane (PDMS) solution was coated on the polyvinylidene fluoride (PVDF)/non-woven polyethylene terephthalate (PET). After a cross-linking reaction at 120° C., the composite separator was formed. The gas permeation rate (Gurley value) of the composite separator was about 6.3 sec/10 cc. The tensile strength of the composite separator was about 305 kgf/cm². After baking at 200° C. for 20 minutes, the composite separator was still intact, as shown in FIG. 1. At that time, the gas permeation rate (Gurley value) of the composite separator was about 3.1 sec/10 cc.

Example 2

Preparation of the Separator (2)

In this example, the prepared separator was a three-layer composite separator (A/B/C layers). The A layer was composed of porous non-woven polyethylene terephthalate (PET), with a thickness of about 30-40 μm. The B layer was composed of polyvinylidene fluoride (PVDF). The C layer was composed of polydimethylsiloxane (PDMS). The A layer was prepared by melt spinning. Next, the polyvinylidene fluoride (PVDF) was dissolved in N-methyl pyrrolidone (NMP) to form a polyvinylidene fluoride (PVDF) solution with a solid content of 14 wt %. The polyvinylidene fluoride (PVDF) solution was then coated on the A layer. After precipitating, washing and drying, the B layer was prepared. The polydimethylsiloxane (PDMS) was then dissolved (diluted) in n-hexane to prepare a polydimethylsiloxane (PDMS) solution with a solid content of 50 wt %. Next, 5 wt % of methyl hydrogen siloxane (cross-linking agent) and 5 wt % of platinum complex (catalyst) were added to the polydimethylsiloxane (PDMS) solution (the contents of the cross-linking agent and the catalyst were based on the solid content of the polydimethylsiloxane (PDMS)). After uniform stirring, the polydimethylsiloxane (PDMS) solution was coated on the polyvinylidene fluoride (PVDF)/non-woven polyethylene terephthalate (PET). After a cross-linking reaction at 120° C., the composite separator was formed. The gas permeation rate (Gurley value) of the composite separator was about 21.2 sec/10 cc. The tensile strength of the composite separator was about 325 kgf/cm². After baking at 200° C. for 20 minutes, the composite separator was still intact. At that time, the gas permeation rate (Gurley value) of the composite separator was about 10.6 sec/10 cc.

Example 3

Preparation of the Separator (3)

In this example, the prepared separator was a three-layer composite separator (A/B/C layers). The A layer was composed of porous non-woven polyethylene terephthalate (PET), with a thickness of about 30-40 μm. The B layer was composed of polyvinylidene fluoride (PVDF). The C layer was composed of polydimethylsiloxane (PDMS). The A layer was prepared by melt spinning. Next, the polyvinylidene fluoride (PVDF) was dissolved in N-methyl pyrrolidone (NMP) to form a polyvinylidene fluoride (PVDF) solution with a solid content of 14 wt %. The polyvinylidene fluoride (PVDF) solution was then coated on the A layer. After precipitating, washing and drying, the B layer was prepared. The polydimethylsiloxane (PDMS) was then dissolved (diluted) in n-hexane to prepare a polydimethylsiloxane (PDMS) solution with a solid content of 60 wt %. Next, 5 wt % of methyl hydrogen siloxane (cross-linking agent) and 5 wt % of platinum complex (catalyst) were added to the polydimethylsiloxane (PDMS) solution (the contents of the cross-linking agent and the catalyst were based on the solid content of the polydimethylsiloxane (PDMS)). After uniform stirring, the polydimethylsiloxane (PDMS) solution was coated on the polyvinylidene fluoride (PVDF)/non-woven polyethylene terephthalate (PET). After a cross-linking reaction at 120° C., the composite separator was formed. The gas permeation rate (Gurley value) of the composite separator was about 79.3 sec/10 cc. The tensile strength of the composite separator was about 350 kgf/cm$^2$. After baking at 200° C. for 20 minutes, the composite separator was still intact. At that time, the gas permeation rate (Gurley value) of the composite separator was about 46.5 sec/10 cc.

Example 4

Preparation of the Separator (4)

In this example, the prepared separator was a three-layer composite separator (A/B/C layers). The A layer was composed of porous non-woven polyethylene terephthalate (PET), with a thickness of about 30-40 µm. The B layer was composed of polyvinylidene fluoride (PVDF). The C layer was composed of polydimethylsiloxane (PDMS). The A layer was prepared by melt spinning. Next, the polyvinylidene fluoride (PVDF) was dissolved in N-methyl pyrrolidone (NMP) to form a polyvinylidene fluoride (PVDF) solution with a solid content of 14 wt %. The polyvinylidene fluoride (PVDF) solution was then coated on the A layer. After precipitating, washing and drying, the B layer was prepared. The polydimethylsiloxane (PDMS) was then dissolved (diluted) in n-hexane to prepare a polydimethylsiloxane (PDMS) solution with a solid content of 75 wt %. Next, 5 wt % of methyl hydrogen siloxane (cross-linking agent) and 5 wt % of platinum complex (catalyst) were added to the polydimethylsiloxane (PDMS) solution (the contents of the cross-linking agent and the catalyst were based on the solid content of the polydimethylsiloxane (PDMS)). After uniform stirring, the polydimethylsiloxane (PDMS) solution was coated on the polyvinylidene fluoride (PVDF)/non-woven polyethylene terephthalate (PET). After a cross-linking reaction at 120° C., the composite separator was formed. The gas permeation rate (Gurley value) of the composite separator was about 185.2 sec/10 cc. The tensile strength of the composite separator was about 411 kgf/cm$^2$. After baking at 200° C. for 20 minutes, the composite separator was still intact. At that time, the gas permeation rate (Gurley value) of the composite separator was about 32 sec/10 cc.

Comparative Example 1

Preparation of a Conventional Separator

In this example, the prepared separator was a two-layer composite separator (A/B layers). The A layer was composed of porous non-woven polyethylene terephthalate (PET), with a thickness of about 30-40 µm. The B layer was composed of polyvinylidene fluoride (PVDF). The A layer was prepared by melt spinning. Next, the polyvinylidene fluoride (PVDF) was dissolved in N-methyl pyrrolidone (NMP) to form a polyvinylidene fluoride (PVDF) solution with a solid content of 14 wt %. The polyvinylidene fluoride (PVDF) solution was then coated on the A layer. After precipitating, washing and drying, the B layer was prepared. The composite separator was thus formed. The gas permeation rate (Gurley value) of the composite separator was about 1.5 sec/10 cc. The tensile strength of the composite separator was about 290 kgf/cm$^2$. After baking at 200° C. for 20 minutes, the gas permeation rate (Gurley value) of the composite separator was less than 1 sec/10 cc (can not be measured), unsuitable for use as a separator in battery.

While the disclosure has been described by way of example and in terms of preferred embodiment, it is to be understood that the disclosure is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A separator utilized in a lithium battery, comprising:
   a non-woven polyester support;
   a porous layer of polyvinylidene fluoride (PVDF) or its derivatives formed on the non-woven polyester support; and
   a layer of polydimethylsiloxane (PDMS) directly formed on top of the porous layer of polyvinylidene fluoride (PVDF) or its derivatives, wherein the layer of polydimethylsiloxane (PDMS) has a coating weight of 19.4-36.4 g/m$^2$,
   wherein the polydimethylsiloxane (PDMS) is a cross-linked polydimethylsiloxane.

2. The separator utilized in a lithium battery in claim 1, wherein the non-woven polyester support comprises polyethylene terephthalate (PET), polypropylene terephthalate (PPT), polycyclohexylene dimethylene terephthalate (PCT) or a combination thereof.

3. The separator utilized in a lithium battery in claim 1, wherein the porous layer of polyvinylidene fluoride (PVDF) or its derivatives comprises polyvinylidene fluoride (PVDF), polyvinylidene fluoride-hexafluoropropene (PVDF-HFP) copolymer, polyvinylidene fluoride-chlorotrifluoroethylene (PVDF-CTFE) copolymer or derivatives or a combination thereof.

4. The separator utilized in a lithium battery in claim 1, wherein the porous layer of polyvinylidene fluoride (PVDF) or its derivatives has a melting point between 160-175° C.

5. The separator utilized in a lithium battery in claim 1, wherein the polydimethylsiloxane (PDMS) is prepared by dimethylsiloxanes having an end group of dimethylvinyl, dimethylhexenyl or trimethylsiloxy or a combination thereof.

6. The separator utilized in a lithium battery in claim 1, wherein the porous layer of polyvinylidene fluoride (PVDF) or its derivatives has a coating weight of 35.6-89 g/m$^2$.

* * * * *